US010230956B2

United States Patent
Hebel et al.

(10) Patent No.: US 10,230,956 B2
(45) Date of Patent: Mar. 12, 2019

(54) APPARATUSES AND METHODS FOR OPTIMIZING RATE-DISTORTION OF SYNTAX ELEMENTS

(71) Applicant: Integrated Device Technology, Inc., San Jose, CA (US)

(72) Inventors: Krzysztof Hebel, Kitchener (CA); Eric C. Pearson, Conestogo (CA); Pavel Novotny, Waterloo (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 781 days.

(21) Appl. No.: 13/627,776

(22) Filed: Sep. 26, 2012

(65) Prior Publication Data

US 2014/0086314 A1    Mar. 27, 2014

(51) Int. Cl.
| | | |
|---|---|---|
| *H04N 19/18* | (2014.01) | |
| *H04N 19/70* | (2014.01) | |
| *H04N 19/103* | (2014.01) | |
| *H04N 19/124* | (2014.01) | |
| *H04N 19/147* | (2014.01) | |

(Continued)

(52) U.S. Cl.
CPC ......... *H04N 19/147* (2014.11); *H04N 19/103* (2014.11); *H04N 19/124* (2014.11); *H04N 19/154* (2014.11); *H04N 19/18* (2014.11); *H04N 19/463* (2014.11);
(Continued)

(58) Field of Classification Search
CPC ... H04N 19/147; H04N 19/154; H04N 19/567
See application file for complete search history.

(56) References Cited

U.S. PATENT DOCUMENTS

| | | | | |
|---|---|---|---|---|
| 5,606,372 A | 2/1997 | Kim | | |
| 5,778,192 A | * 7/1998 | Schuster | ................. | G06T 9/008 |
| | | | | 375/240.01 |

(Continued)

FOREIGN PATENT DOCUMENTS

| | | |
|---|---|---|
| EP | 2493197 A1 | 8/2012 |
| JP | 2004-134911 | 4/2004 |

(Continued)

OTHER PUBLICATIONS

J. Ribas-Corbera & S. Lei, "Rate Control in DCT Video Coding for Low-Delay Communications", 9 IEEE Transactions on Circuits & Sys. for Video Tech. 172-185 (Feb. 1999).*

(Continued)

*Primary Examiner* — David N Werner
(74) *Attorney, Agent, or Firm* — Christopher P. Maiorana, PC

(57) ABSTRACT

Methods and apparatuses for optimizing rate-distortion of syntax elements are disclosed herein. An optimization block may be used in a video encoder and may include a candidate generation block and a best cost block. The optimization block may be configured to generate a plurality of candidates corresponding to respective differential levels. Each of the plurality of candidates may be based, at least in part, on a DC coefficient and provide a respective rate-distortion cost. The best cost block may be coupled to the candidate generation block and may be configured to select a candidate of the plurality of candidates according to a criteria.

35 Claims, 6 Drawing Sheets

(51) Int. Cl.
*H04N 19/154* (2014.01)
*H04N 19/463* (2014.01)
*H04N 19/567* (2014.01)
*H04N 19/517* (2014.01)
*H04N 19/61* (2014.01)

(52) U.S. Cl.
CPC ........... *H04N 19/70* (2014.11); *H04N 19/517* (2014.11); *H04N 19/567* (2014.11); *H04N 19/61* (2014.11)

(56) References Cited

U.S. PATENT DOCUMENTS

| | | | |
|---|---|---|---|
| 6,088,392 A * | 7/2000 | Rosenberg | 375/240.03 |
| 6,501,860 B1 * | 12/2002 | Charrier | G06T 9/008 |
| | | | 375/240.02 |
| 6,519,361 B1 | 2/2003 | Taillie et al. | |
| 6,580,757 B1 * | 6/2003 | Amonou | H04N 19/147 |
| | | | 375/240.11 |
| 7,042,943 B2 * | 5/2006 | Haskell | H04N 19/176 |
| | | | 375/240.03 |
| 7,570,827 B2 * | 8/2009 | Yang | H04N 19/147 |
| | | | 382/245 |
| 7,764,738 B2 | 7/2010 | Kim et al. | |
| 8,654,835 B2 | 2/2014 | Li et al. | |
| 8,780,988 B2 | 7/2014 | Pan et al. | |
| 2004/0131121 A1 | 7/2004 | Dumitras et al. | |
| 2004/0264787 A1 | 12/2004 | Jia | |
| 2005/0201463 A1 | 9/2005 | Lee et al. | |
| 2006/0002465 A1 * | 1/2006 | Raveendran | H04N 19/176 |
| | | | 375/240.01 |
| 2006/0039470 A1 | 2/2006 | Kim et al. | |
| 2006/0039479 A1 | 2/2006 | Francois et al. | |
| 2006/0285594 A1 | 12/2006 | Kim et al. | |
| 2007/0071105 A1 | 3/2007 | Tian et al. | |
| 2007/0165717 A1 * | 7/2007 | Ye | H04N 19/176 |
| | | | 375/240.16 |
| 2007/0171974 A1 | 7/2007 | Baik | |
| 2007/0183500 A1 | 8/2007 | Nagaraj et al. | |
| 2007/0237226 A1 | 10/2007 | Regunathan et al. | |
| 2008/0056354 A1 | 3/2008 | Sun et al. | |
| 2008/0063051 A1 | 3/2008 | Kwon et al. | |
| 2008/0069211 A1 | 3/2008 | Kim et al. | |
| 2008/0126278 A1 | 3/2008 | Bronstein et al. | |
| 2008/0152005 A1 | 6/2008 | Oguz et al. | |
| 2008/0181308 A1 | 7/2008 | Wang et al. | |
| 2008/0192821 A1 | 8/2008 | Malayath et al. | |
| 2008/0232468 A1 | 9/2008 | Kwon et al. | |
| 2008/0298464 A1 | 12/2008 | Hinz et al. | |
| 2008/0310502 A1 | 12/2008 | Kim et al. | |
| 2009/0040080 A1 | 2/2009 | Hwang et al. | |
| 2009/0046779 A1 | 2/2009 | Seok et al. | |
| 2009/0168894 A1 | 7/2009 | Marpe et al. | |
| 2009/0257489 A1 * | 10/2009 | Karczewicz | H04N 19/124 |
| | | | 375/240.03 |
| 2009/0257502 A1 | 10/2009 | Ye et al. | |
| 2010/0008417 A1 | 1/2010 | Xu et al. | |
| 2010/0046614 A1 | 2/2010 | Choi et al. | |
| 2010/0142622 A1 | 6/2010 | Le Leannec et al. | |
| 2010/0238997 A1 * | 9/2010 | Yang | H04N 19/105 |
| | | | 19/105 |
| 2010/0329342 A1 | 12/2010 | Joshi et al. | |
| 2011/0032983 A1 | 2/2011 | Sezer | |
| 2011/0150076 A1 | 6/2011 | Wang et al. | |
| 2011/0164677 A1 | 7/2011 | Lu et al. | |
| 2011/0170591 A1 | 7/2011 | Li et al. | |
| 2011/0261878 A1 | 10/2011 | Lu et al. | |
| 2012/0020582 A1 | 1/2012 | LeLeanec et al. | |
| 2012/0051636 A1 | 3/2012 | Greenebaum et al. | |
| 2012/0140822 A1 | 7/2012 | Wang et al. | |
| 2012/0183051 A1 | 7/2012 | Zhang | |
| 2012/0183056 A1 * | 7/2012 | He | H04N 19/33 |
| | | | 375/240.12 |
| 2012/0201475 A1 | 8/2012 | Carmel et al. | |
| 2012/0250767 A1 | 10/2012 | Valldosera et al. | |
| 2012/0301040 A1 | 11/2012 | Yie et al. | |
| 2013/0089137 A1 | 4/2013 | Korman et al. | |
| 2013/0101031 A1 | 4/2013 | Van Der Auwera et al. | |
| 2013/0114689 A1 | 5/2013 | Chang | |
| 2013/0114735 A1 | 5/2013 | Wang | |
| 2013/0176390 A1 | 7/2013 | Chen et al. | |
| 2013/0279577 A1 | 10/2013 | Schwarz et al. | |
| 2014/0119432 A1 | 5/2014 | Wang | |
| 2014/0119454 A1 | 5/2014 | Hebel et al. | |
| 2014/0168362 A1 | 6/2014 | Hannuksela et al. | |
| 2014/0219331 A1 | 8/2014 | Pai et al. | |
| 2014/0219346 A1 | 8/2014 | Ugur et al. | |
| 2015/0085922 A1 | 3/2015 | Hebel et al. | |
| 2015/0373326 A1 | 12/2015 | Hebel | |

FOREIGN PATENT DOCUMENTS

| | | | |
|---|---|---|---|
| JP | 20102265 | A | 10/2010 |
| JP | 2011176483 | A | 9/2015 |
| KR | 2007-011063 | | 11/2007 |
| KR | 2012-000593 | | 1/2012 |
| WO | 2010036772 | A2 | 4/2010 |
| WO | 2014123741 | | 8/2014 |

OTHER PUBLICATIONS

L. Chen & I. Garbacea, "Adaptive λ estimation in Lagrangian rate-distortion optimization for video coding", 6077 Proc. SPIE 1-8 (Jan. 19, 2006) (Year: 2006).*

Office Action received for JP Patent Appl 2015-538154 dated Mar. 29, 2016.

Rehman, et al., "SSIM-Inspired Perceptual Video Coding for HEVC, 2012 IEEE International Conference on Multimedia and Expo", IEEE, Jul. 2012, pp. 497 to 502, Jul. 2012.

Wang, et al., "SSIM-Motivated Rate-Distortion Optimization for Video Coding, IEEE Transactions on Circuits and Systems For Video Technology", IEEE, Apr. 2012, vol. 22, No. 4, pp. 516 to 529, Apr. 2012.

First Office Action received for CA Application No. 2884825 dated Apr. 19, 2016.

European Search Report received for PCT/US2013061635 dated May 3, 2016.

Notice of Grounds for Rejection received for JP Patent Application 2015-530171 dated Mar. 8, 2016.

Kameyama, Wataru et al., "*Impress Standard Textbook Series: Digital Broadcasting Textbook in IPTV Era*", first edition, edited by Wataru Kameyama and one other, Tokyo: Impress R&D, Apr. 1, 2010, 102-109, 114, 120, 121; 128-133; ISBN: 978-4-8443-2853-7.

Tamiya, Ichiro et al., "*One-Chip MPEG2 Video Encoder LSI μPD61050*", NEC Technical Journal, vol. 52, No, 3, NEC Corporation, Mar. 25, 1999, 85-88. ISSN: 0285-4139.

Yasuda, Hiroshi et al., "*Digital Broadcasting/Information Compression Technique for Internet*", first edition, translated and edited by Hiroshi Yasuda arid one other, Tokyo: Kyoritsu Shuppan, Jun. 10, 1999, 165-167; ISBN: 4-320-02936-4.

Gershikov, et al., "On optimal coding of visual information for Rate-Controlled communication", Internet, 2008. ICI 2008. 4th IEEE/IFIP International Conference on, IEEE, Piscataway, NJ, USA, pp. 1-5, XP031351771, ISBN: 978-1-4244-2282-1 (Sep. 23, 2008).

Marpe, et al., "MB adaptive residual colour transform for 4:4:4 coding, Document JVT-R071, Joint Video Team (IVT) of ISO/IEC MPEG & ITU-T VCEG(ISO/IEC JTC1/SC29/WG11 and ITU-T SGI6 Q6)", No. 18th, pp. 1-14, XP002433332 (Jan. 14, 2006).

Wang, et al., "SSIM-Motivated Rate-Distortion Optimization for Video Coding", IEEE Transactions on Circuits and Systems for Video Technology, IEEE Service Center, Piscataway, NJ, US, vol. 22, No. 4, pp. 516-529, XP011440419, ISSN: 1051-8215 (Apr. 1, 2012).

Yang, et al., "Rate Distortion Optimization for H.264 Interframe Coding: A General Framework and Algorithms", IEEE Transactions

(56) References Cited

OTHER PUBLICATIONS on Image Processing, IEEE Service Center, Piscataway, NJ, US, vol. 16, No. 7, pp. 1774-1784, XP011185448, ISSN: 1057-7149 (Jul. 1, 2007).
International Search Report & Written Opinion for International Application No. PCT/US2013/061635, dated Jan. 15, 2014.

* cited by examiner

APPARATUSES AND METHODS FOR OPTIMIZING RATE-DISTORTION OF SYNTAX ELEMENTS

TECHNICAL FIELD

Embodiments of this invention relate generally to video encoding, and more specifically, to rate-distortion optimization of syntax elements.

BACKGROUND OF THE INVENTION

Video or other media signals may be used by a variety of devices, including televisions, broadcast systems, mobile devices, and both laptop and desktop computers. Typically, devices may display video in response to receipt of video or other media signals, often after decoding the signal from an encoded form. Video signals provided between devices are often encoded using one or more of a variety of encoding and/or compression techniques, and video signals are typically encoded in a manner to be decoded in accordance with a particular standard, such as MPEG-2, MPEG-4, and H.264/MPEG-4 Part 10. By encoding video or other media signals, then decoding the received signals, the amount of data needed to be transmitted between devices may be significantly reduced.

Video encoding is typically performed by encoding 16-by-16 pixel blocks called macroblocks, or other units, of video data. Prediction coding may be used to generate predictive blocks and residual blocks, where the residual blocks represent a difference between a predictive block and the block being coded. Prediction coding may include spatial and/or temporal predictions to remove redundant data in video signals, thereby further increasing the reduction of data needed to be sent or stored. Intracoding for example, is directed to spatial prediction and reducing the amount of spatial redundancy between blocks in a frame or slice. Intercoding, on the other hand, is directed toward temporal prediction and reducing the amount of temporal redundancy between blocks in successive frames or slices. Intercoding may make use of motion prediction to track movement between corresponding blocks of successive frames or slices.

Typically, syntax elements, such as coefficients and motion vectors, may be encoded using one of a variety of encoding techniques (e.g., entropy encoding) and subsequently transmitted between the encoding device and the decoding device. In addition, several approaches may further attempt to optimize syntax elements. That is, many video encoding methodologies make use of some form of trade off between an achievable data rate and the amount of distortion present in a decoded signal. Most known methodologies, however, are capable of optimizing only particular syntax elements, or are not capable of being employed in real-time implementations. As a result, and in particular for more complex encoding algorithms, optimization of syntax elements in real-time has presented challenges.

DETAILED DESCRIPTION

Examples of methods and apparatuses for optimizing rate-distortion tradeoff of syntax elements are described herein. Rate-distortion tradeoff may, for example, be optimized for syntax elements in accordance with one or more coding standards and/or based on a plurality of generated candidates for those syntax elements. Certain details are set forth below to provide a sufficient understanding of embodiments of the invention. However, it will be clear to one having skill in the art that embodiments of the invention may be practiced without these particular details, or with additional or different details. Moreover, the particular embodiments of the present invention described herein are provided by way of example and should not be used to limit the scope of the invention to these particular embodiments. In other instances, well-known video components, encoder or decoder components, circuits, control signals, timing protocols, and software operations have not been shown in detail in order to avoid unnecessarily obscuring the invention.

Figure 1:
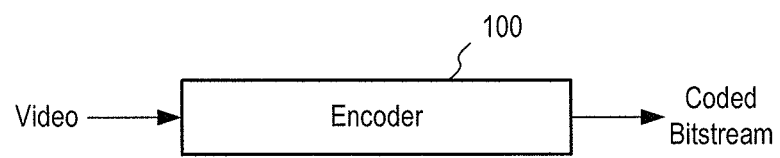
FIG. 1 is a block diagram of an encoder according to an embodiment of the invention.

FIG. 1 is a block diagram of an encoder 100 according to an embodiment of the invention. The encoder 100 may include one or more logic circuits, control logic, logic gates, processors, memory, and/or any combination or sub-combination of the same, and may be configured to encode and/or compress a video signal using one or more encoding techniques, examples of which will be described further below. The encoder 100 may be configured to encode, for example, a variable bit rate signal and/or a constant bit rate signal, and generally may operate at a fixed rate to output a bitstream that may be generated in a rate-independent manner. The encoder 100 may be implemented in any of a variety of devices employing video encoding, including but not limited to, televisions, broadcast systems, mobile devices, and both laptop and desktop computers. In at least one embodiment, the encoder 100 may include an entropy encoder, such as a variable-length coding encoder (e.g., Huffman encoder or CAVLC encoder), and/or may be configured to encode data, for instance, at a macroblock level. Each macroblock may be encoded in intra-coded mode, inter-coded mode, bidirectionally, or in any combination or subcombination of the same.

As an example, the encoder 100 may receive and encode a video signal that in one embodiment, may include video data (e.g., frames). The video signal may be encoded in accordance with one or more encoding standards, such as MPEG-2, MPEG-4, H.263, H.264, and/or H.HEVC, to provide an encoded bitstream, which may in turn be provided to a data bus and/or to a device, such as a decoder or transcoder (not shown). As will be explained in more detail below, a video signal may be encoded by the encoder 100 such that rate-distortion tradeoff of syntax elements may be optimized. In one embodiment, for example, rate-distortion tradeoff of DC coefficients may be optimized for one or more components of a video signal (e.g., luminance and/or chrominance components).

As known, syntax elements may comprise symbols that may be used, for instance, in a bitstream, to provide a compressed representation of a video signal. Syntax elements may include one or more elements of a video signal having syntax in accordance with one or more coding standards, such as coefficients, motion vectors, and various levels of a syntax hierarchy (e.g. sequence, frame, or block). Moreover, rate-distortion optimization may refer to a process designed to select a particular rate-distortion trade-off where a sufficient rate is maintained with an allowable amount of distortion. Rate-distortion cost function may typically be represented by a lambda factor λ, or lambda, multiplied by the rate and the product added to the distortion, as illustrated by the following formula:

$$J=D+\lambda*R,$$

where J represents the rate-distortion cost, or "RD score," for one or more syntax elements such as a coefficient. Alternatively, the formula may be expressed as the following:

$$J=D*\lambda^{-1}+R$$

Generally, encoding methods may aim to minimize the RD score, for example, for a given bit rate. Lambda may be determined by the encoder 100, may be provided by a device, such as a decoder, transcoder, or logic circuit (not shown), or may be specified by a user.

Figure 2:
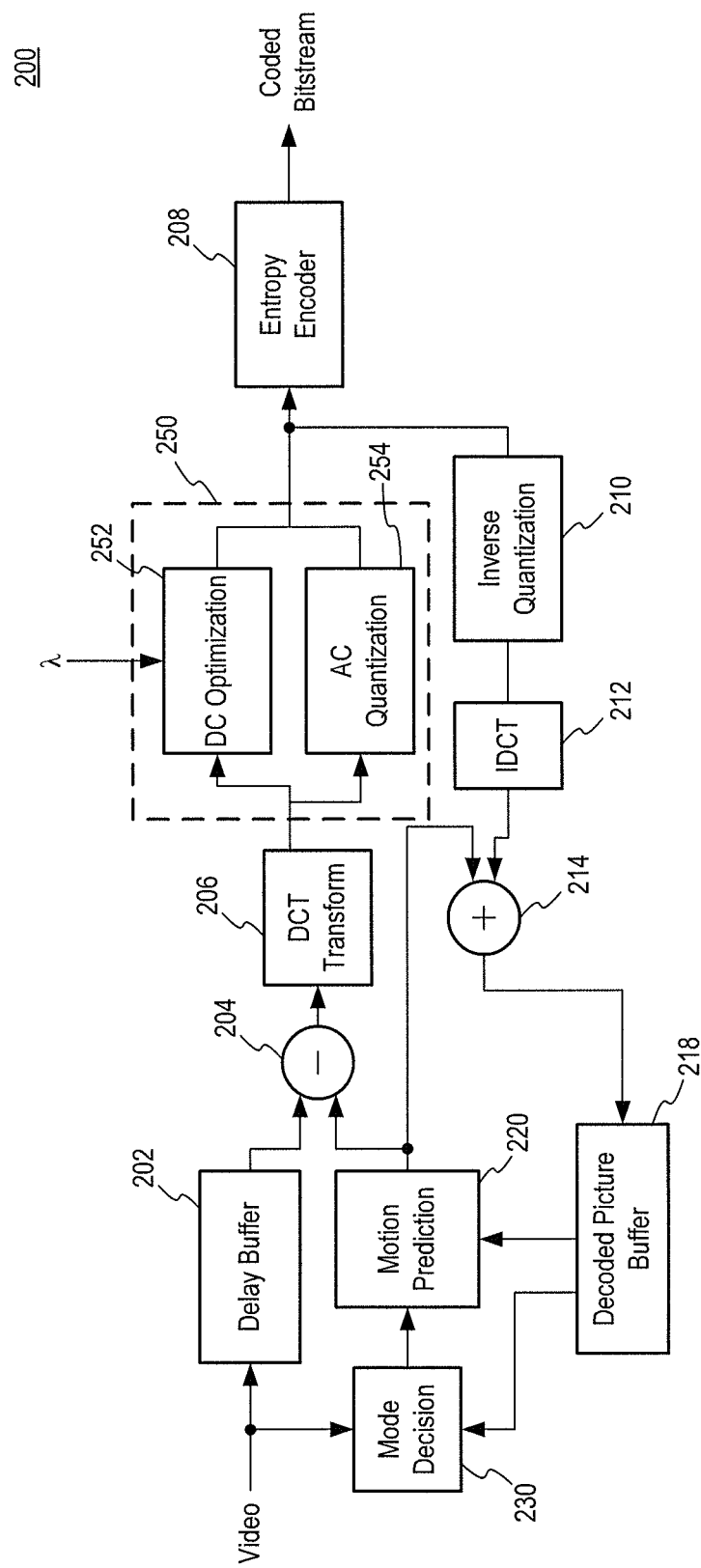
FIG. 2 is a schematic block diagram of an encoder according to an embodiment of the invention.

FIG. 2 is a schematic block diagram of an encoder 200 according to an embodiment of the invention. The encoder 200 may be used to implement, at least in part, the encoder 100 of FIG. 1, and may further be compliant with the MPEG-2 coding standard. In some embodiments, the encoder 200 may additionally or alternatively be compliant with one or more other coding standards known in the art, such as the H.264 coding standard.

The encoder 200 may include a mode decision block 230, a prediction block 220, a delay buffer 202, a transform 206, a quantization block 250, an entropy encoder 208, an inverse quantization block 210, an inverse transform block 212, an adder 214, and a decoded picture buffer 218. The mode decision block 230 may be configured to determine an appropriate coding mode based, at least in part, on the incoming base band video signal and decoded picture buffer signal, described further below, and/or may determine an appropriate coding mode on a per frame and/or macroblock basis. The mode decision may include macroblock type, intra modes, inter modes, syntax elements (e.g., motion vectors), and/or quantization parameters. In some examples of the present invention, the mode decision block 230 may provide lambda for use by the quantization block 250, as described further below. The mode decision block 230 may also utilize lambda in making mode decisions in accordance with examples of the present invention. In some embodiments, lambda may be common across mode decision block 230 and quantization block 250.

The output of the mode decision block 230 may be utilized by the prediction block 220 to generate the predictor in accordance with the MPEG-2 coding standard and/or other prediction methodologies. The predictor may be subtracted from a delayed version of the video signal at the subtractor 204. Using the delayed version of the video signal may provide time for the mode decision block 230 to act. The output of the subtractor 204 may be a residual, e.g. the difference between a block and a prediction for a block.

The transform 206 may be configured to perform a transform, such as a discrete cosine transform (DCT), on the residual to transform the residual to the frequency domain. As a result, the transform 206 may provide a coefficient block that may, for instance, correspond to spectral components of data in the video signal. For example, the coefficient block may include a DC coefficient corresponding to a zero frequency component of the coefficient block that may, for instance, correspond to an average value of the block. The coefficient block may further include a plurality of AC coefficients corresponding to higher (non-zero) frequency portions of the coefficient block.

The quantization block 250 may be configured to receive the coefficient block and quantize the coefficients (e.g., DC coefficient and AC coefficients) of the coefficient block to produce a quantized coefficient block. The quantization provided by the quantization block 250 may be lossy and/or may also utilize lambda to adjust and/or optimize rate-distortion tradeoff for one or more coefficients of the coefficient block. Lambda may be received from the mode decision block 230, may be specified by a user, or may be provided by another element of the encoder 200. Lambda may be adjusted for each macroblock or for any other unit, and may be based on information encoded by the encoder 200 (e.g., video signals encoding advertising may utilize a generally larger lambda or smaller lambda inverse than video signals encoding detailed scenes).

In turn, the entropy encoder 208 may encode the quantized coefficient block to provide an encoded bitstream. The entropy encoder 208 may be any entropy encoder known by those having ordinary skill in the art or hereafter developed, such as a variable length coding (VLC) encoder. The quantized coefficient block may also be inverse scaled and quantized by the inverse quantization block 210. The inverse scaled and quantized coefficients may be inverse transformed by the inverse transform block 212 to produce a reconstructed residual, which may be added to the predictor at the adder 214 to produce reconstructed video. The reconstructed video may be provided to the decoded picture buffer 218 for use in future frames, and further may be provided from the decoded picture buffer 218 to the mode decision block 230 for further in-macroblock intra prediction or other mode decision methodologies.

In at least one embodiment, the quantization block 250 may include a DC optimization block 252 and an AC quantization block 254. The AC quantization block 254 may be configured to receive one or more AC coefficients of a coefficient block and quantize the AC coefficients using any number of quantization methodologies known in the art, now or the future. As will be explained in more detail below, the DC optimization block 252 may be configured to receive the DC coefficient of the coefficient block and optimize the DC coefficient. As an example, the DC optimization block 252 may be configured to generate a plurality of candidates based on the DC coefficient, and select one of the plurality of candidates according to one or more criteria to provide an optimized DC coefficient. In one embodiment, optimizing the DC coefficient may include selecting the candidate having a lowest rate-distortion cost. In another embodiment, optimizing the DC coefficient may include selecting the candidate corresponding to a set of DC coefficients having a lowest rate-distortion cost for a given set of blocks. The optimization may be based, at least in part, on a Lagrangian cost function, such as lambda, or may be based, at least in part, on the inverse of lambda, or inverse lambda. Lambda may, for instance, be a rate scaling factor for determining a cost (e.g., rate-distortion cost) of a signal. Moreover, lambda may be generated by the mode decision block 230 based, at least in part, on the video signal, and may be fixed or adjusted in real-time. In some embodiments, lambda may be adjusted in an adaptive manner (e.g., based on available resources of the encoder 200, the encoded bitstream, or the video signal).

As discussed, the encoder 200 may operate in accordance with the MPEG-2 video coding standard. Thus, because the MPEG-2 video coding standard employs motion prediction and/or compensation, the encoder 200 may further include a feedback loop that includes an inverse quantization block 210, an inverse transform 212, and a reconstruction adder 214. These elements may mirror elements included in a decoder (not shown) that is configured to reverse, at least in part, the encoding process performed by the encoder 200. Additionally, the feedback loop of the encoder may include a prediction block 220 and a decoded picture buffer 218.

In an example operation of the encoder 200, a video signal (e.g. a base band video signal) may be provided to the encoder 200. The video signal may be provided to the delay buffer 202 and the mode decision block 230. The subtractor 204 may receive the video signal from the delay buffer 202 and may subtract a motion prediction signal from the video signal to generate a residual signal. The residual signal may be provided to the transform 206 and processed using a forward transform, such as a DCT. As described, the transform 206 may generate a coefficient block that may be provided to the quantization block 250, and the quantization block 250 may quantize and/or optimize the DC coefficient of the coefficient block. Quantization of the coefficient block may be based, at least in part, on lambda or inverse lambda, and quantized coefficients may be provided to the entropy encoder 208 and thereby encoded into an encoded bitstream.

The quantized coefficient block may further be provided to the feedback loop of the encoder 200. That is, the quantized coefficient block may be inverse quantized, inverse transformed, and added to the motion prediction signal by the inverse quantization block 210, the inverse transform 212, and the reconstruction adder 214, respectively, to produce a reconstructed video signal. The decoded picture buffer 218 may receive the reconstructed video signal, and provide buffered reconstructed video signals to the mode decision block 230 and the prediction block 220. Based, at least in part, on the reconstructed video signals, the prediction block 220 may provide a motion prediction signal to the adder 204.

Accordingly, the encoder 200 of FIG. 2 may provide a coded bitstream based on a video signal, where the coded bitstream is generated in part using DC coefficients optimized in accordance with embodiments of the present invention. The encoder 200 may be operated in semiconductor technology, and may be implemented in hardware, software, or combinations thereof. In some examples, the encoder 200 may be implemented in hardware with the exception of the mode decision block 230 that may be implemented in software. In other examples, other blocks may also be implemented in software, however software implementations in some cases may not achieve real-time operation.

Figure 3:
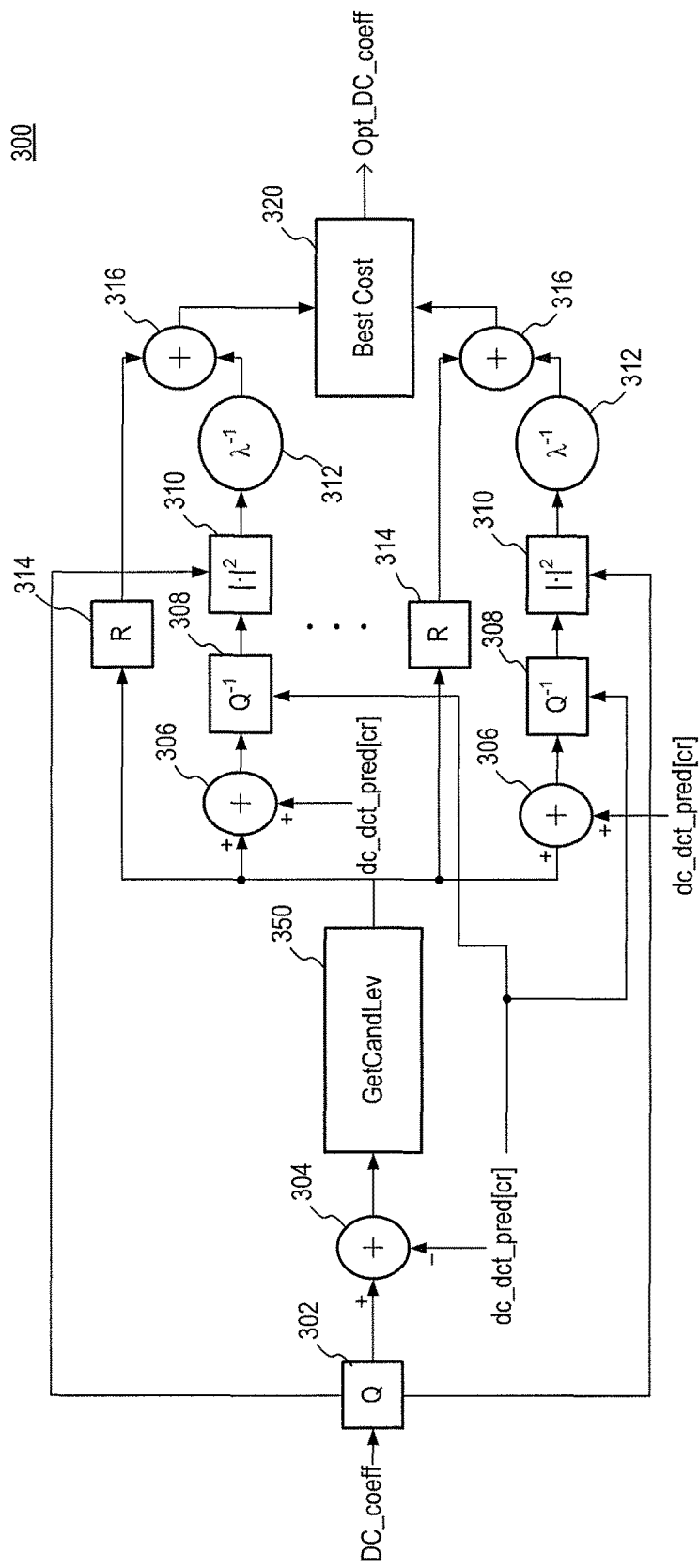
FIG. 3 is a schematic block diagram of a optimization block according to an embodiment of the invention.

FIG. 3 is a schematic block diagram of an optimization block 300 according to an embodiment of the invention. The optimization block 300 may be used to implement, at least in part, the DC optimization block 252 of FIG. 2, and may be compliant, for instance, with any of the MPEG-2, H.264, and H.HEVC coding standards. The optimization block 300 may be implemented in semiconductor technology, and may be implemented in hardware, software, or combinations thereof.

As described, the optimization block 300 may receive a DC coefficient of a coefficient vector and generate a plurality of candidates for the DC coefficient. Generally, the optimization block 300 may operate to perform a forward quantization on a DC coefficient. The quantization may, for instance, be a normative quantization and/or may include dividing the DC coefficient by a value, such as an integer value (e.g., 1, 2, 4, 8, etc.). The previous quantized DC coefficient may be subtracted from the current quantized DC coefficient to provide a DC coefficient differential. Candidates may be generated based on the DC coefficient differential, and each candidate may be added to the previous quantized DC coefficient, inverse quantized, squared, and multiplied by inverse lambda to provide a distortion cost for each candidate. Each distortion cost may be added to a respective rate cost to produce respective RD scores. As described above, in another embodiment, each RD score may be generated by multiplying a rate for a coding a respective candidate by lambda and adding a distortion for that the respective candidate. Based, at least in part, on the RD scores of the candidates, a candidate may be selected and provided from the optimization block 300 as the optimized DC coefficient.

In an example operation of the optimization block 300, a DC coefficient of a coefficient block may be provided to the optimization block 300, and in particular, to the forward quantization block 302. As known, the forward quantization block 302 may quantize the DC coefficient, and in some embodiments, may quantize the DC coefficient in accordance with a coding standard (e.g., MPEG-2 coding standard) and/or based on a quantization parameter. In this manner, a quantized coefficient may be generated in accordance with one or more quantization methodologies. The quantization of the DC coefficient may include dividing the coefficient by a value, such as an integer value, and the magnitude of the value may determine the precision of the quantization of the DC coefficient.

The quantized DC coefficient may be provided to the subtractor 304, where a previous DC coefficient may be subtracted from the received DC coefficient to provide a coefficient differential. The previous DC coefficient may, for instance, be stored in a register (not shown in FIG. 3), or may be received from an external device. Based, at least in part, on the coefficient differential, the candidate generation block 350 may generate a plurality of candidates. As will be described, the plurality of candidates may be generated based, at least in part, on various levels of the DC coefficient differential by which the optimization block 300 may determine which candidate has an optimized RD score. Any number of candidates may be simultaneously considered by the optimization block 300, and in at least one embodiment, each candidate may correspond to a different differential level. Moreover, in one embodiment up to 12 candidates may be simultaneously considered.

To calculate the RD score for each candidate, the quantization block 300 may be configured to calculate a rate cost and a distortion cost for each candidate and sum the two costs together. In particular, each candidate may be provided to a respective rate cost block 314 which may determine a rate for the received candidate. In one embodiment, the rate cost block may be configured determine a respective rate cost using rate lookup tables and/or by encoding the DC coefficient and determining the bit count of the resulting encoded DC coefficient.

Each candidate may further be used to calculate a distortion cost. First, each candidate may be provided to a respective adder 306 that may add the candidate to the previous quantized DC coefficient differential. The candidate may then be provided to a respective inverse quantization block 308 that may reverse the quantization of the quantization block 302. For example, in an embodiment where the quantization block 302 is configured to divide a coefficient by an integer, the inverse quantization block 308 may be configured to multiply a candidate by the same integer. In other embodiments, the inverse quantization block 308 may be configured to inverse quantize a candidate in a manner that does not reverse the quantization performed by the quantization block 302.

Once a candidate has been inverse quantized, it may be subtracted from the quantized DC coefficient, and the result of this subtraction may be squared using square block 310. The squared result may be multiplied by inverse lambda using distortion block 312, thereby providing a distortion cost for the respective candidate. At an adder 316, the rate and distortion costs of a respective candidate may be added to provide an RD score, which may subsequently be provided to the best cost block 320. The best cost block 320 may receive the RD score for each candidate and select a candidate to provide as an optimized DC coefficient. The best cost block 320 may, for instance, select a differential candidate having the lowest RD score and/or a lowest distortion for a given rate, or may select a candidate corresponding to a set of DC coefficients having a lowest rate-distortion cost for a set of blocks, as described below.

Accordingly, the optimization block 300 may be used to provide an optimized DC coefficient based on a DC coefficient received, for instance, from a transform, such as the transform 206 of FIG. 2. In one embodiment, the optimization block 300 may be used to serially provide optimized DC coefficients for each component in a video signal (e.g., luminance, blue-difference chrominance, and/or red-difference chrominance). In other embodiments, multiple DC coefficients may be simultaneously optimized. For example, in one embodiment, a DC optimization block, such as the DC optimization block 252 of FIG. 2 may include a plurality of optimization blocks 300, each of which may correspond to a video signal component. Each of these DC optimization blocks 300 may be configured to operate in parallel to provide optimized DC coefficients at approximately a same time.

Moreover, a plurality of optimization blocks 300 may be used to optimize any number of blocks and/or macroblocks of a slice simultaneously. In one embodiment, to overcome any inter-block dependencies, a plurality of optimization blocks may be used in accordance with dynamic programming and/or a trellis configuration to simultaneously find a set of DC coefficients having a lowest rate-distortion cost for a set of blocks. Additionally, or alternatively, the plurality of optimization blocks 300 may be arranged in a daisy chain configuration to implement dynamic programming. In some instances, one or more DC coefficients of the set of DC coefficients may not have the lowest RD score of all candidates of its respective block despite that the set of DC coefficients has the lowest RD score of all considered combinations of DC coefficients for the set of blocks.

While the optimization block 300 has been described with respect to optimizing DC coefficients of respective transform blocks, it will be appreciated by those having ordinary skill in the art that the optimization block 300 may further be used to optimize other syntax elements as well. That is, the optimization block 300 may be used to generate a plurality of candidates for any type of syntax element, including, for instance, any differentially coded syntax elements, and subsequently select one of the plurality of candidates having a lowest RD score. As an example, an optimization block 300 may be used to optimize one or more AC coefficients provided to an AC quantization block, such as the AC quantization block 254 of FIG. 2. Moreover, in some embodiments, rate-distortion of motion vectors may be optimized for instance, without quantizing the differentially coded syntax element or inverse quantizing candidates generated therefrom.

The optimization block 300 further may be used to optimize motion vectors. For example, an optimization block 300 may be used to optimize rate-distortion of motion vectors in accordance with the MPEG-2 standard. Using an optimization block 300 in this manner may, for instance, reduce the number of bits required to transmit motion vector residuals indicative of differences between respective motion vectors and predictors and/or motion codes indicative of the number of bits used to code respective motion vector residuals. Similarly, the optimization block 300 may also be used to optimize motion vectors (e.g., Exp-Golomb coded motion vectors) and/or quantization parameters in accordance with the H.264 coding standard.

Figure 4:
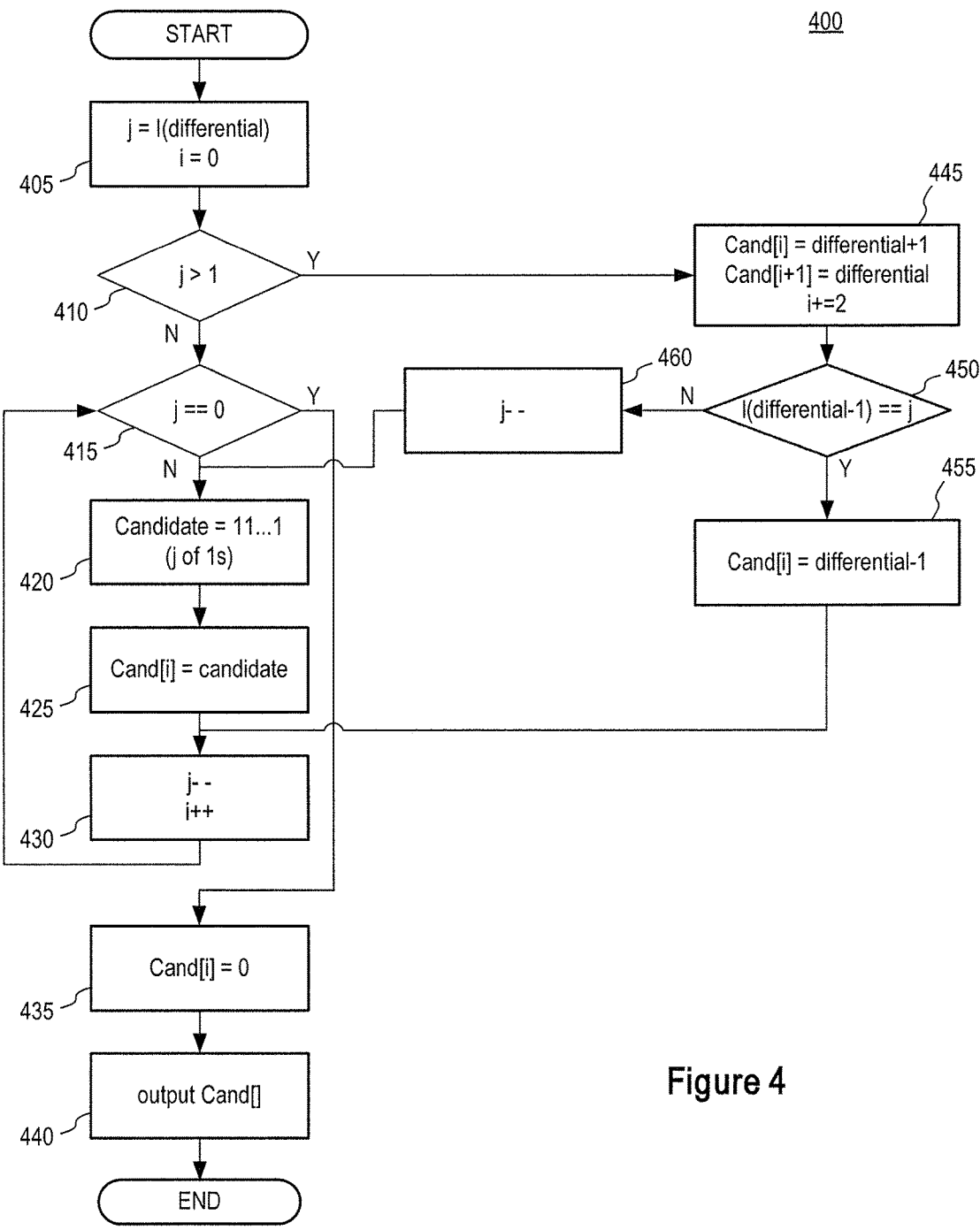
FIG. 4 is a flowchart of a method for generating candidate differentials according to an embodiment of the invention.

FIG. 4 is a flowchart 400 for a method for generating candidates according to an embodiment of the invention. The method illustrated by the flowchart 400 may be used by the candidate generation block 350 of FIG. 3. In at least one embodiment, each generated candidate may be added to an array of candidates Cand and once all candidates have been generated, each candidate included in the array Cand may be considered by the candidate generation block 350, as described above. While the following description is made with respect to generating candidates based on a DC coefficient differential, it will be appreciated by those having ordinary skill in the art that the method illustrated by the flowchart 400 may be used for generating candidates for any syntax element and or syntax element differential, corresponding to, for instance, motion vectors or quantization parameters.

At a step 405, a coefficient differential may be received, for instance, from the adder 304 of FIG. 3. A length variable j may be initialized with a value equal to the number of bits required to represent the coefficient differential using any entropy coding methodology known in the art, now or in the future, such as Huffman encoding, CAVLC, and CABAC, and an index variable i may be initialized to 0. In at least one embodiment, the index variable i may correspond to a position in the array Cand. At a step 410, the candidate generation block 350 may determine if j has a value greater than 1. That is, the candidate generation block 350 may determine whether the bit length of the coefficient differential exceeds one bit. If the value of j is not greater than 1, at a step 415, the candidate generation block 350 may determine if j has a value of 0. If j is equal to zero, a candidate comprising a value of zero may be added to the ith position, of the array of candidates Cand at a step 435. The array Cand may then be provided from the candidate generation block 350 at a step 440.

If the value of j is greater than zero, a candidate may be generated at a step 420. The candidate may be a binary value having the bit length equal to the value of j, and further may comprise all "ones," thereby providing a candidate having a highest binary value possible for a particular bit length. For example, if j has a value of 4, a candidate "1111" may be generated. As will be explained further below, in cases where j initializes as a value greater than 1, generating a candidate in this manner may, provide a candidate having a binary value as close as possible to a previously generated candidate while still decreasing the bit length. This may, for example, avoid generating candidates having increasing distortion costs without decreasing bit counts.

At a step 425, the generated candidate may be added to the array Cand, for instance at the ith position of the array, and at a step 430, the values of j and i may be decremented and incremented, respectively. The steps 415, 420, 425, and 430 may be iteratively repeated until j has been decremented to 0, wherein a candidate comprising zero may be added to the array Cand and the array provided from the candidate generation block 350 at steps 435 and 440, respectively, as described above.

If at the step 410, it is determined that j has a value greater than 1, that is, if the bit length of the received coefficient differential is two bits or greater, at a step 445, the coefficient differential and the coefficient differential incremented by 1 may be added to the array Cand as candidates. At the step 450, a determination may be made as to whether decrementing the coefficient differential by 1 will change its bit length. If the bit length would not change, a candidate comprising the coefficient differential decremented by 1 may be added to the array Cand at a step 455, and the candidate generation block 350 may proceed to the step 430, as described above. If decrementing the coefficient differential by 1 would change the bit length, j may be decremented at a step 460 and a candidate having a bit length equal to the magnitude of j may be generated at the step 420 as described above.

Accordingly, a plurality of candidates may be generated by the candidate generation block 350 and each of the generated candidates may subsequently be evaluated by an optimization block, such as the optimization block 300 of FIG. 3, to determine which of the candidates provides an optimized rate-distortion cost. The candidates may be a respective plurality of differential levels based on the coefficient differential. That is, as described, the differential levels of the candidates may, for example, include the coefficient differential, the coefficient differential incremented by 1, the coefficient differential decremented by 1, zero, and/or the highest possible binary values for all possible bit lengths less than the bit length of the coefficient differential.

While candidate generation has been described with respect to the method 400, in other embodiments, additional and/or alternative methods may be used to generate candidates, including, but not limited to, variations of the method 400. For example, in one embodiment, the method 400 may omit the step 455, thereby eliminating the addition of candidates having a binary value of 0 to the array Cand.

The number of candidates may further be determined adaptively. In one embodiment, the number of candidates may depend on a quantizer scale used for quantizing the AC coefficients in a particular macroblock. The quantizer scale may, for instance, be determined by a quantization parameter. For example, the quantization parameter may determine a precision for AC coefficients, and this precision may be used to determine a maximum deviation by which candidates may deviate from the coefficient differential. In another embodiment, the number of candidates may depend on characteristics of a particular coding unit (e.g., block, macroblock, frame). Characteristics of a coding unit considered in this determination may include, but are not limited to, texture, brightness, motion, variance, or any combination thereof. By way of example, more distortion may be allowable in high-motion content, and as a result, candidates having larger deviation from the coefficient differential may be evaluated.

In each case where the number of candidates is adaptively determined, whether or not a candidate satisfies one or more criteria may be determined at any point in the method 400, for instance, at the step 445. If a candidate satisfies an allowable deviation, for example, the candidate may be added to the array Cand. If the candidate does not satisfy the allowable deviation, the candidate will not be added to the array Cand and accordingly will not be evaluated by an optimization block, as described above.

Moreover, in at least one embodiment, the allowable number of candidates may be based on available resources of an encoder, such as the encoder 100 of FIG. 1, or one or more devices in electronic communication with the encoder. This determination may be made prior to encoding or during encoding as part of an adaptive process, including any adaptive process described herein.

Figure 5:
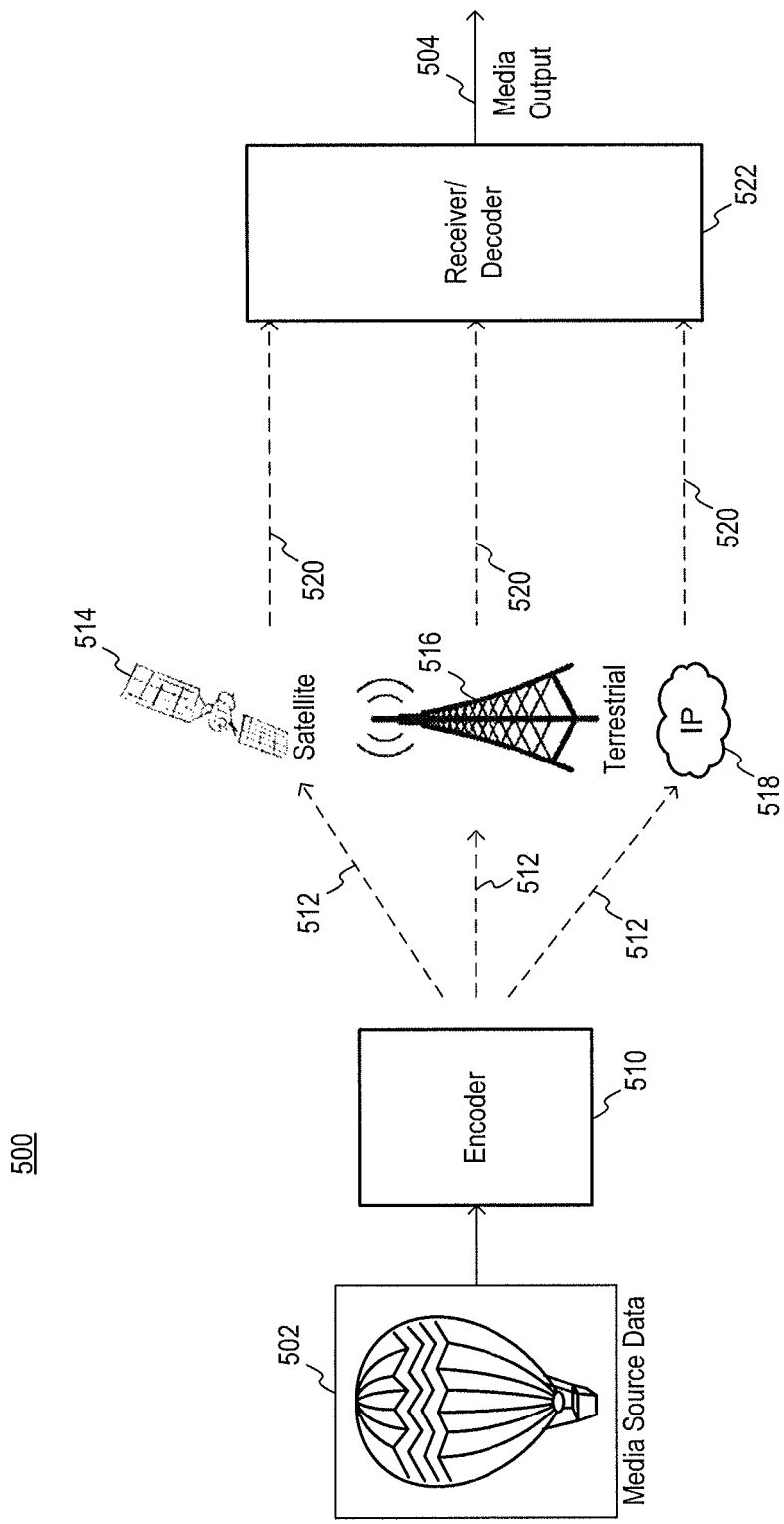
FIG. 5 is a schematic illustration of a media delivery system according to an embodiment of the invention.

FIG. 5 is a schematic illustration of a media delivery system in accordance with embodiments of the present invention. The media delivery system 500 may provide a mechanism for delivering a media source 502 to one or more of a variety of media output(s) 504. Although only one media source 502 and media output 504 are illustrated in FIG. 5, it is to be understood that any number may be used, and examples of the present invention may be used to broadcast and/or otherwise deliver media content to any number of media outputs.

The media source data 502 may be any source of media content, including but not limited to, video, audio, data, or combinations thereof. The media source data 502 may be, for example, audio and/or video data that may be captured using a camera, microphone, and/or other capturing devices, or may be generated or provided by a processing device. Media source data 502 may be analog or digital. When the media source data 502 is analog data, the media source data 502 may be converted to digital data using, for example, an analog-to-digital converter (ADC). Typically, to transmit the media source data 502, some type of compression and/or encryption may be desirable. Accordingly, an encoder 510 may be provided that may encode the media source data 502 using any encoding method in the art, known now or in the future, including encoding methods in accordance with video standards such as, but not limited to, MPEG-2, MPEG-4, H.264, H.HEVC, or combinations of these or other encoding standards. The encoder 510 may be implemented using any encoder described herein, including the encoder 100 of FIG. 1 and the encoder 200 of FIG. 2, and further may be used to implement the method 400 of FIG. 4.

The encoded data 512 may be provided to a communications link, such as a satellite 514, an antenna 516, and/or a network 518. The network 518 may be wired or wireless, and further may communicate using electrical and/or optical transmission. The antenna 516 may be a terrestrial antenna, and may, for example, receive and transmit conventional AM and FM signals, satellite signals, or other signals known in the art. The communications link may broadcast the encoded data 512, and in some examples may alter the encoded data 512 and broadcast the altered encoded data 512 (e.g. by re-encoding, adding to, or subtracting from the encoded data 512). The encoded data 520 provided from the communications link may be received by a receiver 522 that may include or be coupled to a decoder. The decoder may decode the encoded data 520 to provide one or more media outputs, with the media output 504 shown in FIG. 5.

The receiver 522 may be included in or in communication with any number of devices, including but not limited to a modem, router, server, set-top box, laptop, desktop, computer, tablet, mobile phone, etc.

The media delivery system 500 of FIG. 5 and/or the encoder 510 may be utilized in a variety of segments of a content distribution industry.

Figure 6:
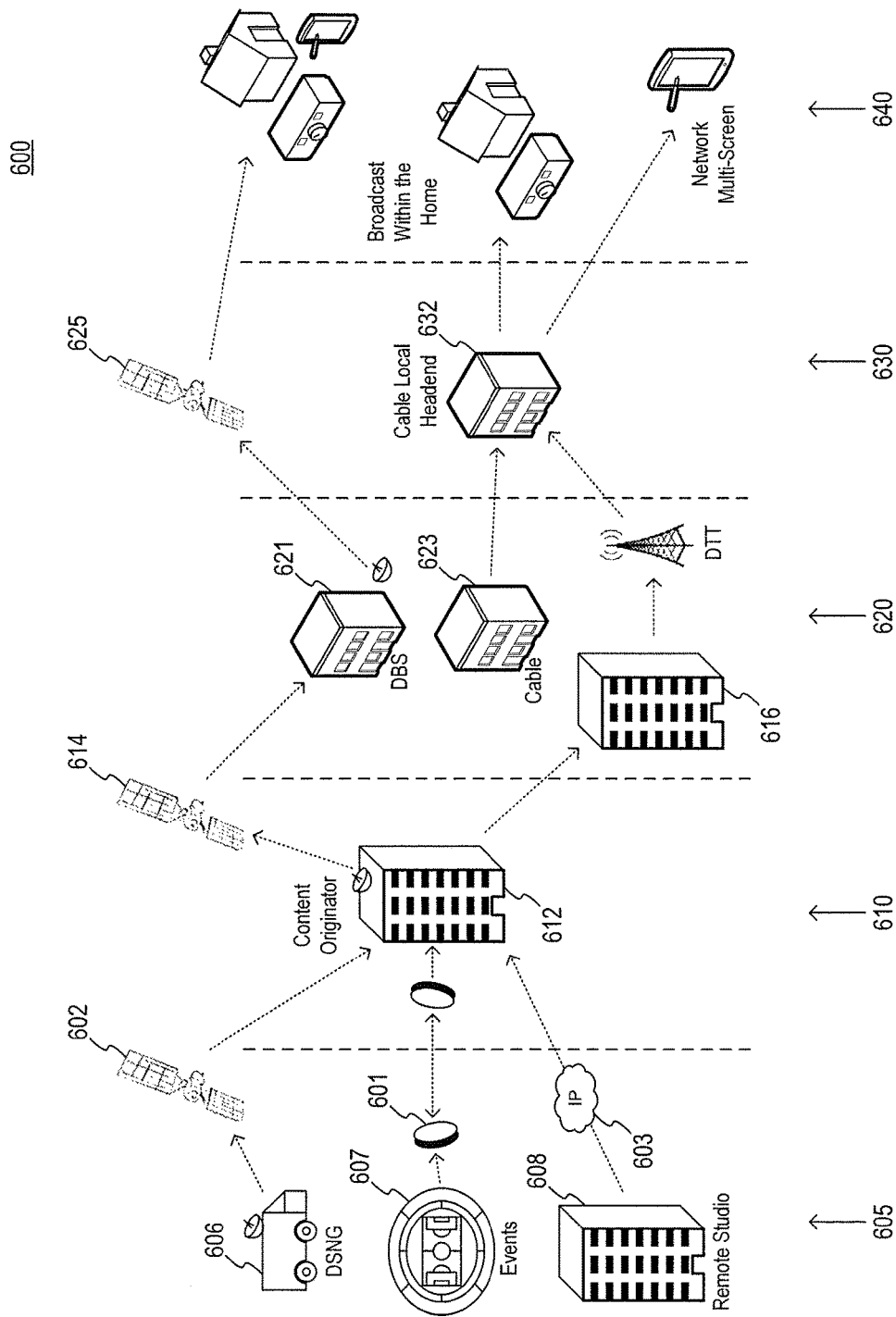
FIG. 6 is a schematic illustration of a video distribution system that may make use of encoders described herein.

FIG. 6 is a schematic illustration of a video distribution system that 600 may make use of encoders described herein. The video distribution system 600 includes video contributors 605. The video contributors 605 may include, but are not limited to, digital satellite news gathering systems 606, event broadcasts 607, and remote studios 608. Each or any of these video contributors 605 may utilize an encoder described herein, such as the encoder 510 of FIG. 5, to encode media source data and provide encoded data to a communications link. The digital satellite news gathering system 606 may provide encoded data to a satellite 602 The event broadcast 607 may provide encoded data to an antenna 601. The remote studio 608 may provide encoded data over a network 603.

A production segment 610 may include a content originator 612. The content originator 612 may receive encoded data from any or combinations of the video contributors 605. The content originator 612 may make the received content available, and may edit, combine, and/or manipulate any of the received content to make the content available. The content originator 612 may utilize encoders described herein, such as the encoder 510 of FIG. 5, to provide encoded data to the satellite 614 (or another communications link). The content originator 612 may provide encoded data to a digital terrestrial television system 616 over a network or other communication link. In some examples, the content originator 612 may utilize a decoder to decode the content received from the contributor(s) 605. The content originator 612 may then re-encode data and provide the encoded data to the satellite 614. In other examples, the content originator 612 may not decode the received data, and may utilize a transcoder to change an encoding format of the received data.

A primary distribution segment 620 may include a digital broadcast system 621, the digital terrestrial television system 616, and/or a cable system 623. The digital broadcasting system 621 may include a receiver, such as the receiver 522 described with reference to FIG. 5, to receive encoded data from the satellite 614. The digital terrestrial television system 616 may include a receiver, such as the receiver 522 described with reference to FIG. 5, to receive encoded data from the content originator 612. The cable system 623 may host its own content which may or may not have been received from the production segment 610 and/or the contributor segment 605. For example, the cable system 623 may provide its own media source data 502 as that which was described with reference to FIG. 5.

The digital broadcast system 621 may include an encoder, such as the encoder 510 described with reference to FIG. 5, to provide encoded data to the satellite 625. The cable system 623 may include an encoder, such as the encoder 510 described with reference to FIG. 5, to provide encoded data over a network or other communications link to a cable local headend 632. A secondary distribution segment 630 may include, for example, the satellite 625 and/or the cable local headend 632.

The cable local headend 632 may include an encoder, such as the encoder 510 described with reference to FIG. 5, to provide encoded data to clients in a client segment 540 over a network or other communications link. The satellite 625 may broadcast signals to clients in the client segment 640. The client segment 640 may include any number of devices that may include receivers, such as the receiver 522 and associated decoder described with reference to FIG. 5, for decoding content, and ultimately, making content available to users. The client segment 640 may include devices such as set-top boxes, tablets, computers, servers, laptops, desktops, cell phones, etc.

Accordingly, encoding, transcoding, and/or decoding may be utilized at any of a number of points in a video distribution system. Embodiments of the present invention may find use within any, or in some examples all, of these segments.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An encoder comprising:
a DC optimization block, comprising
a forward quantization block configured to quantize a current differentially coded syntax element,
a difference block configured to generate a differentially coded syntax element differential by subtracting a previous differentially coded syntax element from the current differentially coded syntax element,
a candidate generation block configured to generate a plurality of candidates corresponding to respective differential levels of the differentially coded syntax element differential, each of the plurality of candidates based, at least in part, on the differentially coded syntax element differential and providing a respective rate-distortion cost, wherein (a) the respective rate-distortion cost comprises a sum of (i) a rate cost determined for each candidate and (ii) a distortion cost determined for each candidate, and (b) the distortion cost is determined by adding the previous differentially coded syntax element to each candidate, inverse quantizing the sum of the previous differentially coded syntax element and each candidate, squaring, and multiplying by an inverse lambda factor of the encoder, and
a best cost block coupled to the candidate generation block and configured to select a candidate of the plurality of candidates according to one or more criteria, wherein the plurality of candidates are simultaneously considered by the best cost block; and
an AC quantization block configured to receive a plurality of AC coefficients and quantize the plurality of AC coefficients.

2. The encoder of claim 1, wherein the one or more criteria comprises a smallest rate-distortion cost.

3. The encoder of claim 1, wherein:
the forward quantization block is configured to quantize the differentially coded syntax element in accordance with the MPEG-2 coding standard, the H.264 coding standard, or a combination thereof.

4. The encoder of claim 1, wherein the respective rate-distortion costs are based, at least in part, on a Lagrangian cost function.

5. The encoder of claim 1, wherein the plurality of candidates are based, at least in part, on a length of the differentially coded syntax element differential.

6. The encoder of claim 1, wherein the differentially coded syntax element corresponds to luminance, blue-difference chrominance, red-difference chrominance, or any combination thereof.

7. The encoder of claim 1, wherein the differentially coded syntax element comprises a DC coefficient.

8. The encoder of claim 1, wherein the candidate generation block is configured to generate the plurality of candidates adaptively.

9. An encoder, comprising:
a DC optimization block configured to receive a DC coefficient, quantize the received DC coefficient, generate a DC coefficient differential by subtracting a previous DC coefficient from a current DC coefficient, and generate a plurality of candidates based, at least in part, on the DC coefficient differential, the DC optimization block further configured to select a candidate from the plurality of candidates according to a smallest rate-distortion cost, wherein (a) each of the plurality of candidates corresponds to a respective level of the DC coefficient differential, (b) a respective rate-distortion cost of each candidate comprises a sum of (i) a rate cost determined for each candidate and (ii) a distortion cost determined for each candidate, (c) the distortion cost is determined by adding a previous differentially coded syntax element to each candidate, inverse quantizing the sum of the previous differentially coded syntax element and each candidate, squaring, and multiplying by an inverse lambda factor of the encoder, and (d) the plurality of candidates are simultaneously considered by the DC optimization block; and
an AC quantization block configured to receive a plurality of AC coefficients and quantize the plurality of AC coefficients.

10. The encoder of claim 9, wherein the DC optimization block is further configured to quantize the received DC coefficient in accordance with the MPEG-2 coding standard.

11. The encoder of claim 9, wherein the DC optimization block is further configured to quantize the received DC coefficient in accordance with the H.264 coding standard.

12. The encoder of claim 9, further comprising:
an entropy encoder coupled to the DC optimization block and the AC quantization block and configured to receive the selected candidate and quantized plurality of AC coefficients, the entropy encoder further configured to encode the candidate and quantized plurality of AC coefficients in accordance with one or more coding standards.

13. The encoder of claim 9, wherein the received DC coefficient comprises a luminance coefficient, a blue-difference chrominance coefficient, a red-difference chrominance coefficient, or any combination thereof.

14. The encoder of claim 9, wherein one of the plurality of candidates comprises a highest binary value for its respective bit length, the bit length of the one of the plurality of candidates less than a bit length of the received DC coefficient.

15. The encoder of claim 9, wherein the received DC coefficient corresponds to an intracoded macroblock.

16. The encoder of claim 9, wherein one of the plurality of candidates comprises the DC coefficient.

17. The encoder of claim 9, wherein the DC optimization block is a first DC optimization block, the received DC coefficient is a first DC coefficient, the DC coefficient differential is a first DC coefficient differential, the plurality of candidates is a first plurality of candidates, the first DC coefficient corresponds to a first block of video data, and the encoder further comprises:
a second DC optimization block configured to receive a second DC coefficient, quantize the second DC coefficient, generate a second DC coefficient differential by subtracting a previous DC coefficient from the current DC coefficient, and generate a second plurality of candidates based, at least in part, on the second DC coefficient differential, the second DC coefficient corresponding to a second block of video data, wherein the first DC optimization block is configured to select one of the first plurality of candidates based, at least in part, on the first and second plurality of candidates.

18. A method for optimizing a coefficient, comprising:
receiving a differentially coded syntax element;
generating a differentially coded syntax element differential by subtracting a previous differentially coded syntax element from a current differentially coded syntax element;
generating a plurality of candidates based, at least in part, on the differentially coded syntax element differential, each of the plurality of candidates having a respective differential level of the differentially coded syntax element differential;
generating a respective rate-distortion (RD) score for each of the plurality of candidates, wherein (a) the respective rate-distortion score of each candidate comprises a sum of (i) a rate cost determined for each candidate and (ii) a distortion cost determined for each candidate, and (b) the distortion cost is being determined by adding the previous differentially coded syntax element to each candidate, inverse quantizing the sum of the previous differentially coded syntax element and each candidate, squaring, and multiplying by an inverse of a predetermined lambda factor; and
selecting one of the plurality of candidates according to one or more criteria, wherein the plurality of candidates are simultaneously considered.

19. The method of claim 18, wherein said selecting comprises:
selecting one of the plurality of candidates having a smallest RD score.

20. The method of claim 18, wherein the differentially coded syntax element comprises a DC coefficient.

21. The method of claim 18, wherein the plurality of candidates are generated in accordance with the MPEG-2 coding standard, the H.264 coding standard, or a combination thereof.

22. The method of claim 18, wherein said generating a respective RD score for each of the plurality of candidates comprises:
generating a distortion cost for each of the plurality of candidates; and
generating a rate cost for each of the plurality of candidates.

23. The method of claim 18, wherein the plurality of candidates are based, at least in part, on a length of the differentially coded syntax element differential.

24. The method of claim 18, wherein the differentially coded syntax element is a first differentially coded syntax element, the method further comprising:
subtracting a second differentially coded syntax element from the first differentially coded syntax element to generate a coefficient differential.

25. The method of claim 18, wherein each respective RD score is based, at least in part, on an inverse of a Lagrangian cost function.

26. The method of claim 18, wherein the plurality of candidates is based on a quantization parameter, characteristics of a coding unit, or a combination thereof.

27. A method for generating candidates used by an encoder to encode a video signal, comprising:
receiving a differentially coded syntax element differential comprising a difference between a current differentially coded syntax element and a previous differentially coded syntax element;

determining a bit length of the differentially coded syntax element differential;

generating a plurality of candidates, a number of the plurality of candidates based, at least in part, on the bit length of the differentially coded syntax element differential;

generating a respective plurality of rate-distortion costs for the plurality of candidates, wherein (a) the respective rate-distortion cost of each candidate comprises a sum of (i) a rate cost determined for each candidate and (ii) a distortion cost determined for each candidate, and (b) the distortion cost is being determined by adding the previous differentially coded syntax element to each candidate, inverse quantizing the sum of the previous differentially coded syntax element and each candidate, squaring, and multiplying by an inverse lambda factor of the encoder;

selecting one of the plurality of candidates based, at least in part, on the respective plurality of rate-distortion costs, wherein the plurality of candidates are simultaneously considered; and replacing the current differentially coded syntax element with the selected candidate, wherein the selected candidate is used to encode the video signal.

28. The method of claim 27, wherein one of the plurality of candidates comprises a highest possible binary value for its respective bit length.

29. The method of claim 27, wherein the plurality of rate-distortion costs are based, at least in part, on a Lagrangian cost function.

30. The method of claim 27, wherein said selecting one of the plurality of candidates based, at least in part, on the respective plurality of rate-distortion costs comprises:
    selecting a coefficient corresponding to a luminance component.

31. The method of claim 30, wherein the plurality of candidates is a first plurality of candidates, the method further comprising:
    generating a second plurality of candidates based on a coefficient corresponding to a chrominance component, wherein the first and second plurality of candidates are generated simultaneously.

32. The method of claim 27, wherein the differentially coded syntax element comprises a DC coefficient.

33. The method of claim 27, wherein each of the respective plurality of rate-distortion costs are based, at least in part, on the MPEG-2 coding standard.

34. The method of claim 27, wherein each of the respective plurality of rate-distortion costs are based, at least in part, on the H.264 coding standard.

35. The method of claim 27, wherein the plurality of candidates least part, on texture, brightness, motion, variance, or a combination thereof.

* * * * *